US011250085B2

(12) United States Patent
Bastide et al.

(10) Patent No.: US 11,250,085 B2
(45) Date of Patent: Feb. 15, 2022

(54) USER-SPECIFIC SUMMARY GENERATION BASED ON COMMUNICATION CONTENT ANALYSIS

(71) Applicant: INTERNATIONAL BUSINESS MACHINES CORPORATION, Armonk, NY (US)

(72) Inventors: Paul R. Bastide, Ashland, MA (US); Matthew E. Broomhall, Goffstown, NH (US); Robert E. Loredo, North Miami Beach, FL (US); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/697,437

(22) Filed: Nov. 27, 2019

(65) Prior Publication Data

US 2021/0157867 A1 May 27, 2021

(51) Int. Cl.
*G06F 16/00* (2019.01)
*G06F 16/9535* (2019.01)
*G06F 16/9536* (2019.01)
*G06F 3/01* (2006.01)
*G06F 16/9538* (2019.01)
*G06F 16/901* (2019.01)
*G06F 40/295* (2020.01)

(52) U.S. Cl.
CPC .......... *G06F 16/9535* (2019.01); *G06F 3/011* (2013.01); *G06F 16/9024* (2019.01); *G06F 16/9536* (2019.01); *G06F 16/9538* (2019.01); *G06F 40/295* (2020.01)

(58) Field of Classification Search
CPC ............ G06F 16/9535; G06F 16/9536; G06F 16/9538; G06F 16/9024; G06F 3/011; G06F 40/295
See application file for complete search history.

(56) References Cited

U.S. PATENT DOCUMENTS 9,824,112 B1 * 11/2017 Gardner, III ...... G06F 16/24568
2003/0163537 A1    8/2003 Rohall
2010/0049770 A1 *  2/2010 Ismalon ............ G06Q 30/0269
                                                             707/765
2014/0316767 A1   10/2014 Fitterer
(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — Hung Q Pham
(74) *Attorney, Agent, or Firm* — Kristofer L. Haggerty

(57) ABSTRACT

The method, computer program product and computer system may include computing device which may collect application data from one or more applications and archive the application data into a datastore. The computing device may generate a network graph based on the archived application data. The computing device may detect a user's focus on a piece of content contained within the one or more applications, retrieve data associated with the piece of content and determine the user's skill in relation to the piece of content. The computing device may determine the complexity of the piece of content in relation to the determined skill of the user and generate and present a summary of the piece of content.

20 Claims, 6 Drawing Sheets

(56) References Cited

U.S. PATENT DOCUMENTS

2015/0331849 A1   11/2015 Porat
2017/0039874 A1    2/2017 Peterson
2017/0315825 A1   11/2017 Gordon
2018/0190138 A1    7/2018 Chetlur
2018/0295422 A1   10/2018 Newell

* cited by examiner

USER-SPECIFIC SUMMARY GENERATION BASED ON COMMUNICATION CONTENT ANALYSIS

BACKGROUND

The present invention relates generally to a method, system, and computer program for content analysis and summary generation. More particularly, the present invention relates to a method, system, and computer program for user-specific summary generation based on communication content analysis.

Online social networks and collaboration tools are connecting people and information in logical and organized ways to share and process information between users. The most common mechanisms of sharing and processing information are email, text messages, and social networks. These mechanisms enable one to rapidly share information with others, connect, gather and discuss many things and topics. Further, users may join or participate in communities dedicated to particular topics of interest to the user within online social networks and collaboration tools. Thus, online social networks and collaboration tools connects users to spaces and other users in particular areas of interest to the user.

BRIEF SUMMARY

An embodiment of the invention may include a method, computer program product and computer system for content analysis and summary generation. The method, computer program product and computer system may include computing device which may collect application data from one or more applications and archive the application data into a datastore. The computing device may generate a network graph based on the archived application data. The computing device may detect a user's focus on a piece of content contained within the one or more applications, retrieve data associated with the piece of content and determine the user's skill in relation to the piece of content. The computing device may determine the complexity of the piece of content in relation to the determined skill of the user and generate a summary of the piece of content. The summary may contain at least one posting by a second user from the application data on a concept included in the piece of content. The concept may be identified based on the complexity of the concept in relation to the determined skill of the user and the posting may be identified by a relationship in the network graph. The computing device may present, the summary to the user.

DETAILED DESCRIPTION

Figure 1A:
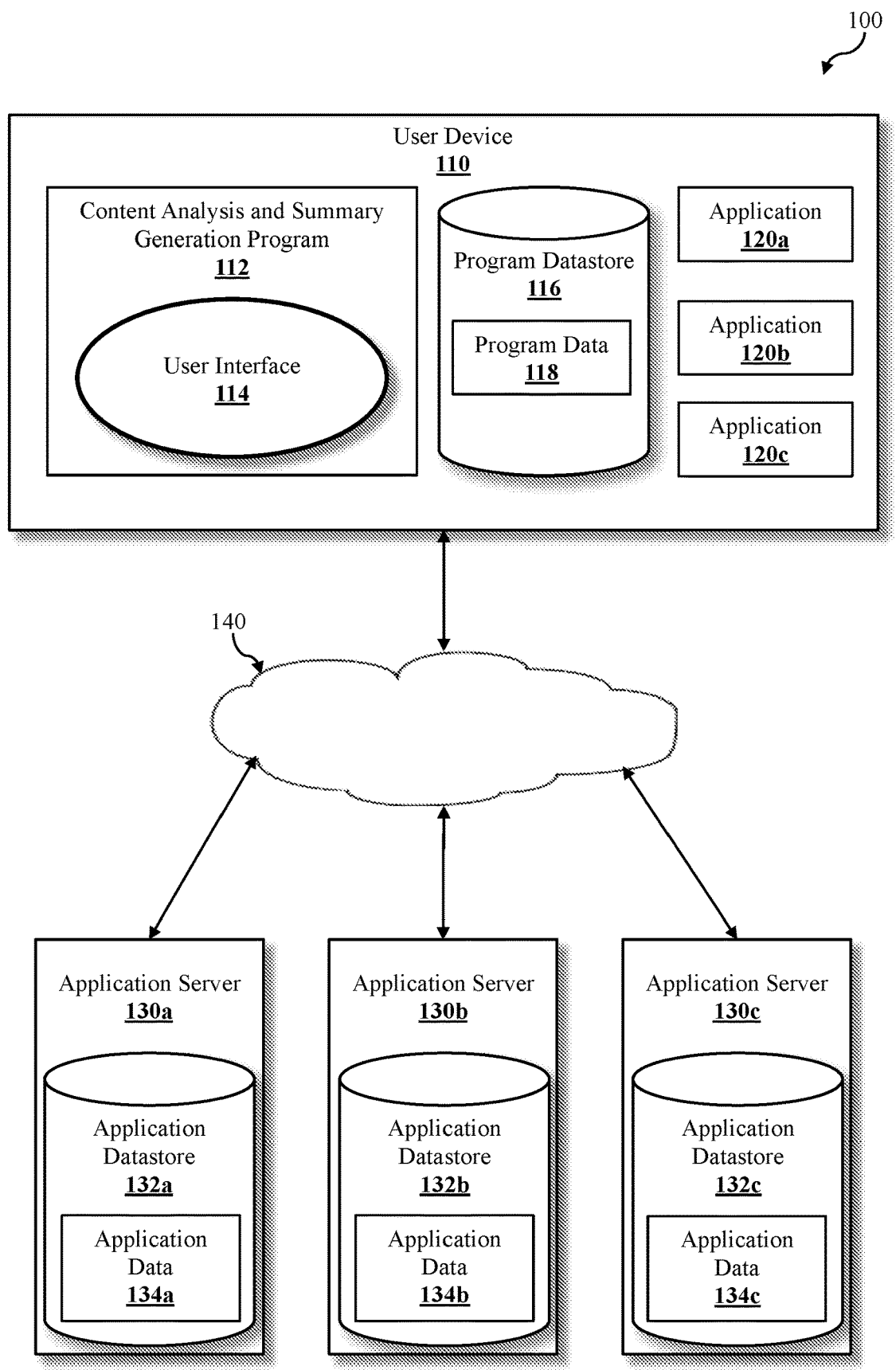
FIG. 1a illustrates a system for content analysis and summary generation, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for content analysis and summary generation. Online communities, social networks, and collaboration tools have a plurality of users, each with unique backgrounds and skills. Currently, there is no means for determining the skill of a user within an online community, social network, or collaboration tool in relation to a certain message or posting within that online community, social network, or collaboration tool. Further, there is no means for determining the complexity of a certain message or posting in relation to a user's skill and then analyzing historical data contained within the various online communities, social networks, and collaboration tools to which to user belongs to generate a summary of that certain message or posting to enable the user to better understand the message or posting.

For example, users A, B, and C may belong to an online discussion group for Organic Chemistry. User A may post a message within the online discussion group such as "Polypeptide synthesis breakthrough for amino acids in the gut. Finally, a breakthrough." Users B and C may view User A's message, but each user may have a different understanding of the that particular topic within Organic Chemistry. Embodiments of the invention may detect User B's focus on User A's message, e.g. User B is viewing the message, and determine User B's skill in relation to the content of User A's message. For example, embodiments of the invention may determine that User B has posted and received may "likes" on his Organic Chemistry messages and posting in the Organic Chemistry discussion group and/or in various other Organic Chemistry online communities, social networks, and/or collaboration tools. Thus, embodiments of the invention would determine that the complexity of User A's message for User B is very low and User A's message would not be summarized or altered for User B as User B has the necessary skills to contribute and be part of the conversation.

However, embodiments of the invention may do the same analysis in relation to User C and determine that User C's skill in relation to the content of User A's message is lacking. For example, embodiments of the invention may determine that User C has no prior posts relayed to the topic of User A's message, that User C has no endorsed skills with the topic area or tags indicating experience and expertise with the topic, that User C has not previously used the language in User A's message. Thus, embodiments of the invention would determine that the complexity of User A's message for User C is very high and build, based on the determined complexity, an on-ramp, e.g. a path to understanding the content, for User C. Embodiments of the invention may extract the language from User A's message that User C is familiar with e.g. molecule construction, building blocks, the stomach, and further extract the language in the message, e.g. 'Polypeptide synthesis', 'amino acids,' etc. Embodiments of the invention then determine a path, e.g. an on-ramp, for User C from familiar content to the message content, linking with intermediate messages which use the intermediate content to contribute definition of the message. Embodiments of the invention then present an on-ramp, e.g. a summary of the content, to User C. Thus, embodiments of the invention provide a user with the ability to intelligently and knowledgeably engage with a message/post.

Reference will now be made in detail to the embodiments of the present invention, examples of which are illustrated in the accompanying drawings, wherein like reference numerals refer to like elements throughout. Embodiments of the invention are generally directed to a system for content analysis and summary generation.

FIG. 1a illustrates a content analysis and summary generation system 100, in accordance with an embodiment of the invention. In an example embodiment, the content analysis and summary generation system 100 may include user device 110, and application servers 130a, 130b, 130c interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), a wide area network (WAN), or a wired or wireless personal area network (PAN). In general, the network 140 can be any combination of connections and protocols that will support communications between the user device 110 and the application servers 130a, 130b, 130c.

The user device 110 may include content analysis and summary generation program 112, program datastore 116, and applications 120a, 120b, 120c. In the example embodiment, the user device 110 may be a desktop computer, a notebook, a laptop computer, a tablet computer, a cellphone, a thin client, or any other electronic device or computing system capable of storing compiling and organizing audio, visual, or textual content and receiving and sending that content to and from other computing devices, such as the application servers 130a, 130b, 130c, and other user devices 110 via the network 140. The user device 110 is described in more detail with reference to FIG. 3. While only a single user device 110 is illustrated, it can be appreciated that any number of user devices 110 may be part of the content analysis and summary generation system 100.

The content analysis and summary generation program 112 may include a user interface 114. The content analysis and summary generation program 112 is a program capable of analyzing the content of communications and determining the skill of a user in relation to that content. The content analysis and summary generation program 112 may then generate a user-specific summary of the analyzed content based on the user's determined skill. The content analysis and summary generation program 112 is described in more detail below with reference to FIG. 1b.

The user interface 114 includes components used to receive input from a user on the user device 110 and transmit the input to the content analysis and summary generation program 112, or conversely to receive information from the content analysis and summary generation program 112 and display the information to the user on the user device 110. In an example embodiment, the user interface 114 uses a combination of technologies and devices, such as device drivers, to provide a platform to enable users of user device 110 to interact with the content analysis and summary generation program 112. In the example embodiment, the user interface 114 receives input, such as but not limited to, textual, visual, or audio input received from a physical input device, such as but not limited to, a keypad, a mouse, a touchscreen, and/or a microphone.

The program datastore 116 may include program data 118. The program datastore 116 may be any storage media capable of storing and managing data, such as, but not limited to, storage media resident in the user device 110 and/or removeable storage media. For example, the program datastore 116 may be, but is not limited to, a hard drive, a solid stated drive, a USB drive, or a memory card, etc. The program datastore 116 may be, for example, but not limited to, an operational or an analytical datastore. Further, the program datastore 116 may be a collection of simple files, such as, but not limited to, e-mails, PDFs, word documents, spreadsheets, etc. The program data 118 may be a collection of the application data 134a, 134b, 134c associated with the applications 120a, 120b, 120c including, but not limited to, audio, visual, and textual files. For example, the program data 118 may include social media feed posts, online community discussion threads, online messages, emails, tweets, SMS texts, MMS texts, videos, etc. The program datastore 116 located on the user device 110 may be accessed through the network 140. In various embodiments, all or part of the program datastore 116 may be installed and run on the user device 110. The program datastore 116 is described in more detail with reference to FIG. 3.

The applications 120a, 120b, 120c be any online social network, online messaging application, and/or collaboration service such as, but not limited to, social media applications, email applications, and instant messaging applications, etc. Examples of such applications 120a, 120b, 120c may be Lotus Notes®, IBM® Sametime, IBM® Connections, Facebook®, Microsoft Outlook®, Gmail®, Slack®, Skype®, WhatsApp®, Apple iMessage, SMS, MMS, etc. While three applications 120a, 120b, 120c are illustrated, it can be appreciated that any number of applications 120 may be part of the content analysis and summary generation system 100 including less than three or more than three depending on the user. As described in the example above, the applications 120a, 120b, 120c may be a messaging platform such as Slack®. Thus, the content analysis and summary generation program 112 may use data, i.e. the application data 134a, 134b, 134c, associated with the application 120a, 120b, 120c to analyze the content of a user's feed and messages. The data associated with applications 120a, 120b, 120c, i.e. the application data 134a, 134b, 134c, may be stored on the application servers 130a, 130b, 130c associated with the applications 120a, 120b, 120c, respectively. For example, a user on the user device 110 may have Lotus Notes®, Facebook®, and Slack® accounts, i.e. the applications 120a, 120b, 120c, and the data associated with each of the applications 120a, 120b, 120c would be stored on the Lotus Notes®, Facebook®, and Slack®, servers, i.e., the application servers 130a, 130b, 130c. The user on the user device may authorize access to a network server or application server's access to the accounts.

The application servers 130a, 130b, 130c may include application datastores 132a, 132b, 132c. While three application servers 130a, 130b, 130c are illustrated, it can be appreciated that any number of application servers 130 may be part of the content analysis and summary generation system 100 including less than three or more than three depending on the user. In the example embodiment, the application servers 130a, 130b, 130c may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110 via the network 140. In some embodiments, the application servers 130a, 130b, 130c include a collection of devices or data sources. The application servers 130a, 130b, 130c are described in more detail with reference to FIG. 3.

The application datastores 132a, 132b, 132c may store the application data 134a, 134b, 134c associated with the applications 120a, 120b, 120c including, but not limited to, audio, visual, and textual files. For example, the application data 134a, 134b, 134c may include social media feed posts, online messages, emails, tweets, SMS messages, MMS messages, etc. The application datastores 132a, 132b, 132c may be any storage media capable of storing data capable of storing data, such as, but not limited to, storage media resident in the application servers 130a, 130b, 130c and/or removeable storage media. For example, the application datastores 132a, 132b, 132c may be, but is not limited to, a hard drive, a solid stated drive, a USB drive, or a memory card, etc. The application datastores 132a, 132b, 132c located on the third-party servers 130a, 130b, 130c may be accessed through the network 140. In various embodiments, all or part of the application datastores 132a, 132b, 132c may be installed and run on the application servers 130a, 130b, 130c. The application datastores 132a, 132b, 132c are described in more detail with reference to FIG. 3.

Figure 1B:
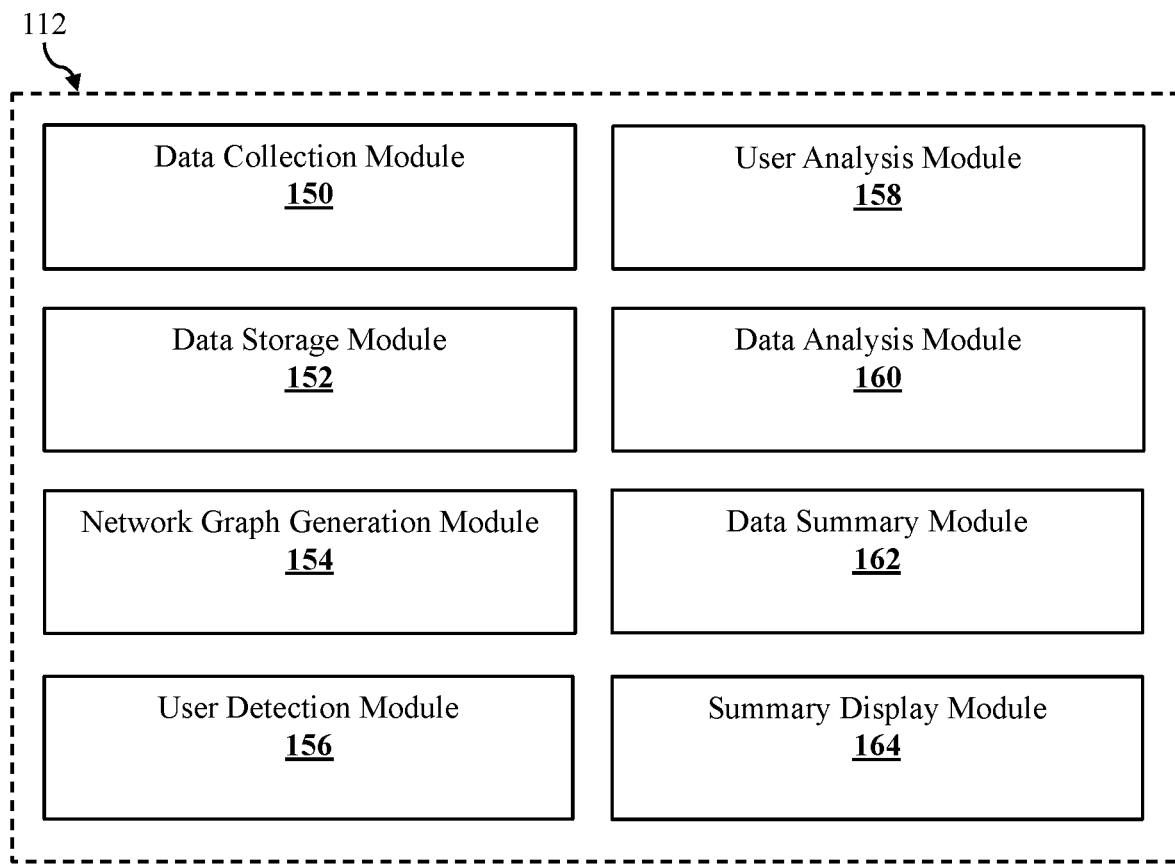
FIG. 1b illustrates example operating modules of the content analysis and summary generation program of FIG. 1a, in accordance with an embodiment of the invention.

Referring to FIG. 1b, example modules of the content analysis and summary generation program 112 are illustrated. In an example embodiment, the content analysis and summary generation program 112 may include eight modules: the data collection module 150, the data storage module 152, the network graph generation module 154, the user detection module 156, the user analysis module 158, the data analysis module 160, the data summary module 162, and the summary display module 164.

The data collection module 150 collects the application data 134a, 134b, 134c associated with the applications 120a, 120b, 120c. For example, the data collection module 150 may collect the application data 134a, 134b, 134c associated with a plurality of collaboration and social media communication services, such as, but not limited to, Lotus Notes®, IBM® Sametime, IBM® Connections, Facebook®, Microsoft Outlook®, Gmail®, Slack®, Skype®, WhatsApp®, Apple iMessage, SMS platforms, and MMS platforms, etc. The data collection module 150 may use any data archiving tool capable of collecting and archiving collaboration and social media communications, such as, but not limited to, application programming interfaces (APIs). For example, the data collection module 150 may use a Gnip® API, a Smarsh® API, or a user interface extension, such as a text command, a menu option, or a browser interceptor, etc. to collect the application data 134a, 134b, 134c. The data collection module 150 may collect the application data 134a, 134b, 134c in real-time or may collect the application data 134a, 134b, 134c in a batch at specified time intervals such as, but not limited to, every 30 seconds, every minute, every 15 minutes, every 30 minutes, every hour, once a day, once a week, once a month, etc. Thus, the data collection module 150 may constantly collect the application data 134a, 134b, 134c from the application servers 130a, 130b, 130c.

The data storage module 152 loads the application data 134a, 134b, 134c which has been collected by the data collection module 150 into the program datastore 116 as the program data 118. The data storage module 152 may store the message data 134a, 134b, 134c in the program datastore 116 using an archive solution such as, but not limited to, Apache HDFS, IBM Connections™ Compliance for Social, or Smarsh® Archiving. The data storage module 152 may extract certain content of the application data 134a, 134b, 134c such as, but not limited to, person references, message identifiers, conversation identifiers, message body content, message subject content, etc. Person references may include, but are not limited to, message recipients, and textual references to person identifiers contained in the content of the application data 134a, 134b, 134c. Message identifiers and conversation identifiers may include, but are not limited to message recipient data, conversation-id, e.g. a usernames, and thread-id, etc. Message body content and message subject content may include, but is not limited to, any textual, audio, or visual content contained within the application data 134a, 134b, 134c. Further, the data storage module 152 may augment the extracted content of the application data 134a, 134b, 134c with data such as, but not limited to, reply-marks, read-marks, "like" data, e.g. Facebook® "likes", up/down vote data, e.g. Reddit® votes, re-tweets on Twitter®, etc. The data storage module 152 may populate the program datastore 116 using natural language processing such as, but not limited to, IBM® Watson natural language classifier. Further, the data storage module 152 may contain opt-in and opt-out parameters for inclusion of the application data 134a, 134b, 134c, into the program datastore 116.

The network graph generation module 154 generates a network graph based on the archived application data 134a, 134b, 134c, i.e. the program data 118. The network graph generation module 154 may load the archived application data 134a, 134b, 134c into a non-relational database management system coupled with an analytics engine and graphing application program interface (API) to generate the network graph. An example non-relational database management system may be, but is not limited to, Apache HBase, etc. The analytics engine may be, but is not limited to, Apache Spark™, etc. The graphing API may be, but is not limited to, Apache Spark™ GraphX, etc. When the application data 134a, 134b, 134c is loaded into a non-relational database management system, the application data 134a, 134b, 134c may be de-duplicated, e.g. only a single piece of data is used when multiple instances of the same piece of data is stored in the application data 134a, 134b, 134c. For example, an e-mail message may be forwarded or to various people, creating duplicate message data as the message content itself would remain the same, but the recipient data would change. Thus, the message data would be de-duplicated such that the message content was only loaded once, but the various recipient data would be retained. The network graph may contain edges which connect to one or more nodes. The network graph edges may be identified as composite keys, e.g. a combination of two or more attributes (e.g. nodes) such as, but not limited to, two or more columns in a table, etc. that can be used to uniquely identify an entity occurrence, such as, but not limited to a table row, etc. For example, the application data 134a may be e-mail data and the network graph may contain nodes such as, but not limited to, message topics, and users connected by edges which link the users to the message topics based on the application data 134a. Continuing with the previous example, the application data 134a may contain two e-mail message chains each directed to a different topic associated with a user of the application 120a on the user device 110. The network graph would illustrate the connection, e.g. edges, between the user, all other message recipients, and message originators, etc. associated with each topic contained within the email data.

The user detection module 156 detects user focus on a piece of content on one of the applications 120a, 120b, 120c. The user detection module 156 may detect a user's focus on a piece of content via the user interface 114. The user detection module 156 may detect user focus using any tracking technology on the user device 110 such as, but not limited to, x-y-z pointer tracking, and finger point tracking. Alternatively, the user detection module 156 may detect a user's eye gaze using an imaging unit on the user device 110, such as, but not limited to, a camera to associate the user's eye gaze with an x-y-z position on a display unit of the user device 110, or to associate the user's eye gaze with the single object in focus. In embodiments of the invention, the user detection module 156 may detect user focus based on the time spent viewing a piece of content on the user device 110 or based on repeated views of a piece of content. The user detection module 156 retrieves the data associated with the piece of content in focus from the application datastores 132a, 132b, 132c. Further, the user detection module 156 processes the data associated with the piece of content in focus into a series of entities using natural language processing (NLP) or concept detection technology. For example, the user may be detected to be focused on a Facebook post stating "Boston Red Sox are at Spring Training." The user detection module 156 may process "Boston Red Sox are at Spring Training" into the entities "Boston Red Sox," "Boston," "Red Sox," "Spring," and "Spring Training." In another example embodiment of the invention, the user detection module 156 may detect user focus on a piece of content that has already been archived in the program datastore 116. For example, but not limited to, the user may be viewing an e-mail that was sent a week ago. Thus, the content analysis and summary generation program 112 may have already collected and archived the data associated with that e-mail. Continuing with the previous example, the user detection module 156 may retrieve the data associated with the piece of content from the program datastore 116 for processing.

The user analysis module 158 determines user's skill in relation to the piece of content detected to be in focus. The user analysis module 158 may utilize natural language processing to analyze the program data 118 and/or the application data 134a, 134b, 134c to determine the user's skill in relation to the piece of content detected to be in focus. The user analysis module 158 may pull application data 134a, 134b, 134c associated with applications 120a, 120b, 120c to determine for example, but not limited to, a user's educational background, a user's job history, a user's job descriptions, a user's professional endorsements, a user's messaging history, a user's social posting history, etc. For example, the application 120a may be a user's LinkedIn® profile, the application 120b may be a user's Facebook® profile, and the application 120c may be a user's IBM® Connections profile. The user analysis module 158 would analyze the application data 134a, 134b, 134c, e.g. the user's LinkedIn®, Facebook®, and IBM® profile data, to determine the user's educational history, the user's job history, the user's job descriptions, and/or the user's feed postings, etc. Also, the user analysis module 158 may determine a user's skill based on the user's relationship with the entities of the piece of content. For example, the user analysis module 158 may determine whether the user's interactions with the entities are inquisitive, e.g. the user has asked questions, or factual, e.g. the user has posted factual items relating to the entities. Further, the user analysis module 158 may determine the user's skill based on inferential expertise. For example, but not limited to, the user analysis module 158 may determine that the user is connected to many software engineers on the applications 120a, 120b, 120c and thus it is likely that the user is also a software engineer and would have expertise in that area. The user analysis module 158 updates the connections of the network graph based on the determined user's skill in relation to the piece of content. For example, the user analysis module 158 may update the connections, i.e. edges, of the network graph between the user and the topic of the piece of content with, but not limited to, the data from the user's accounts on the applications 120a, 120b, 120c, relational data to the piece of content, i.e. similar topical data, and/or inferential expertise, e.g. relevant job or education data etc. In an embodiment of the invention, the user analysis module 158 may updates the connections, i.e. edges, of the network graph permanently. In another embodiment of the invention, the user analysis module 158 may update the connections, i.e. edges, of the network graph temporarily in a sub-graph.

The data analysis module 160 determines the complexity of the piece of content in focus in relation to the determined user skill. The complexity is determined by analyzing the edges of the network graph between the user and the topic of the piece of content in focus. The data analysis module 160 may determine a number of connections between the user and the topic of the piece of content. The more connections a user has to the topic of the piece of content, the less complex the piece of content would be for the user, while fewer connections between the user and the topic of the piece of content, the more complex the piece of content would be for the user. Further, the data analysis module 160 may determine the complexity of the piece of content in focus in relation to the determined user skill based on a threshold. For example, the threshold may be a minimum number of connections, for example, but not limited to, two connections, five connections, ten connections, etc. between the user and the topic of the piece of content indicating the user has an understanding of the topic of the piece of content. The threshold may be defined manually by a user of the content analysis and summary generation program 112, or the threshold may be pre-defined by the content analysis and summary generation program 112. If the number of connections exceeds the threshold, the data analysis module 160 would determine that the topic of the piece of content would not be complex for the user, whereas if the number of connections does not exceed the threshold, the data analysis module 160 would determine that the topic of the piece of content would be complex for the user.

The data summary module 162 generates a summary of the piece of content in response to determining the user's skill in relation the piece of content does not exceed a threshold for the user. The summary may be a path, e.g. an on-ramp, from a known concept to an unfamiliar concept, e.g. unknown concept, using concept relationships of the application data 134a, 134b, 134c and the program data 118. The summary may include any data contained within the program data 118 and the application data 134a, 134b, 134c such as, but not limited to, past messages/posts by the user along with any replies on the applications 120a, 120b, 120c, messages/posts made by other users connected to the user on the applications 120a, 120b, 120c, related topical data on the applications 120a, 120b, 120c, etc. Further, the data summary module 162 may retrieve data from outside the program data 118 and the application data 134a, 134b, 134c such as, but not limited to, other applications, the Internet, files located on the user device 110, etc. The data summary module 162 generate the summary by iteratively defining paths between the piece of content in focus and its entities to entities which the user has previously seen. The data summary module 162 may iteratively define paths between the piece of content and the user to a pre-defined depth of detail and anchoring. For example, a first user on the application 120a may learn about Biology and Chemistry from a message from a second user on the application 120a. The first user may then see a message on the application 120a from a third user containing a concept the first user is not familiar with, e.g. Physics. The data summary module 162 may generate an on-ramp, e.g. a summary, for the message from the third user based on the network graph by analyzing the network graph to determine a starting point where known concepts, e.g. Biology and Chemistry, for the first user intersect with the unknown concept, e.g. Physics. The data summary may be pre-programmed, e.g. for the specific concept, or the data summary may be based on a template. For example, but not limited to, the data summary may be generated using the format: The <CONCEPT> is related to <KNOWN-CONCEPT> which is defined as <DEFINITION>.

The summary display module 164 presents the generated summary to the user. In an example embodiment of the invention, the summary display module 164 may organize the data included in the summary which connects the user to the piece of content chronologically. For example, the data included in the summary may be various social media posts from the application 120a and the summary display module 164 may display the social media posts from the application 120a as a flat list with the posts displayed in chronological. In another example embodiment of the invention, the summary display module 164 may display the summary as a time series historic information flow. The historic information flow may follow guided drill-down paths into concepts related to the piece of content to focus in on the details of the piece of content. In another example embodiment of the invention, the summary display module 164 may present a series of steps based on co-incidence of the user's skill and walk a path towards the user's engagement with the piece of content. Referring to the example presented above regarding the post "Polypeptide synthesis breakthrough for amino acids in the gut. Finally, a breakthrough," by User A (Wilma in the example below), an example summary, e.g. on-ramp, for User C may be a chronological listing of past related messages from other uses in User C's network (Betty and Xavier in the example below). An example on-ramp for the previous example may be:

---

Betty: "Synthesis . . . how about brute force construction - one amino acid at a time."

. . .

Xavier: "Amino acids are our building blocks. Don't break them."

. . .

Wilma: "Polypeptide synthesis breakthrough for amino acids in the gut. Finally, a breakthrough."

---

Figure 2:
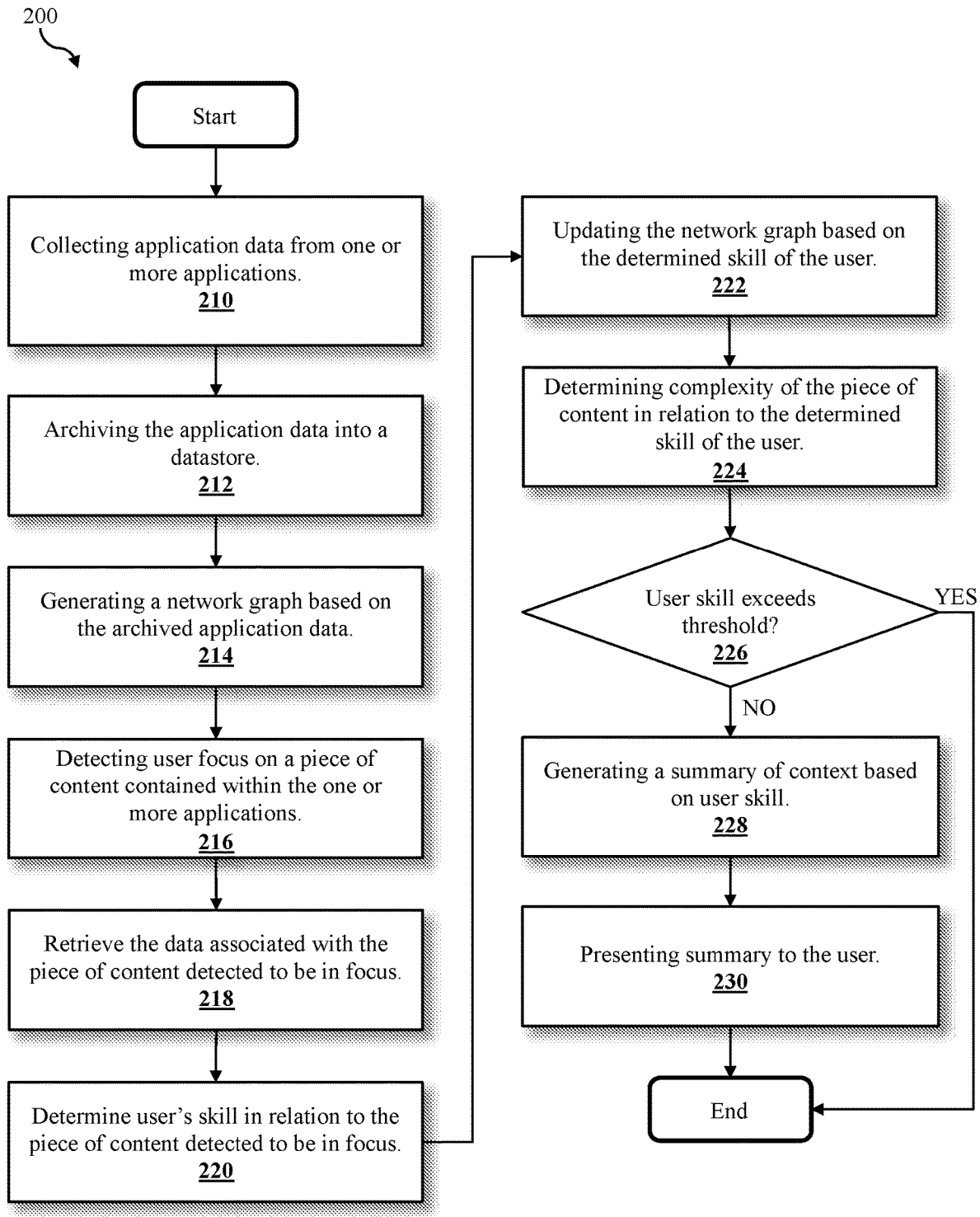
FIG. 2 is a flowchart illustrating an example method of the content analysis and summary generation system, in accordance with an embodiment of the invention.

Referring to FIG. 2, a method 200 for content analysis and summary generation is depicted, in accordance with an embodiment of the present invention.

Referring to block 210, the content analysis and summary generation program 112 collects the application data 134a, 134b, 134c from one or more social media and/or collaboration networks, i.e. the applications 120a, 120b, 120c. Data collection is described in more detail above with reference to the data collection module 150.

Referring to block 212, the content analysis and summary generation program 112 loads the application data 134a, 134b, 134c into the datastore 116 as program data 118 utilizing an archiving solution. Message data archiving is described in more detail above with reference to the data storage module 152.

Referring to block 214, the content analysis and summary generation program 112 generates a network graph based on the archived applications data 134a, 134b, 134c. Network graph generation is described in more detail above with reference to the network graph generation module 154.

Referring to block 216, the content analysis and summary generation program 112 detects user focus on a piece of content contained within one of the applications 120a, 120b, 120c. User focus detection is described in more detail above with reference to the user detection module 156.

Referring to block 218, the content analysis and summary generation program 112 retrieves the data associated with the piece of content detected to be in focus. Data retrieval for the piece of content detected to be in focus is described in more detail above with reference to the user detection module 156.

Referring to block 220, the content analysis and summary generation program 112 determines the user's skill in relation to the piece of content detected to be in focus. User skill determination is described in more detail above with reference to the user analysis module 158.

Referring to block 222, if the content analysis and summary generation program 112 updates the network graph based on the determined skill of the user. Updating the network graph is described in more detail above with reference to the user analysis module 158.

Referring to block 224, the content analysis and summary generation program 112 determines the complexity of the piece of content in relation to the determined skill of the user. Complexity determination is described in more detail above with reference to the data analysis module 160.

Referring to block 226, the content analysis and summary generation program 112 determines if the user's skill in relation the piece of content exceeds a threshold for the user. If the content analysis and summary generation program 112 determines that the user's skill in relation to the piece of content does exceed a threshold, the content analysis and summary generation program 112 terminates. If the content analysis and summary generation program 112 determines that the user's skill in relation the piece of content does not exceed a threshold for the user, the content analysis and summary generation program 112 proceeds to block 228.

Referring to block 228, the content analysis and summary generation program 112 generates a summary of the piece of content based on the determined user skill. Summary generation is described in more detail above with reference to the data summary module 162.

Referring to block 230, the content analysis and summary generation program 112 presents the generated summary to the user on the user device 110. Summary display is described in more detail above with reference to the summary display module 164.

Figure 3:
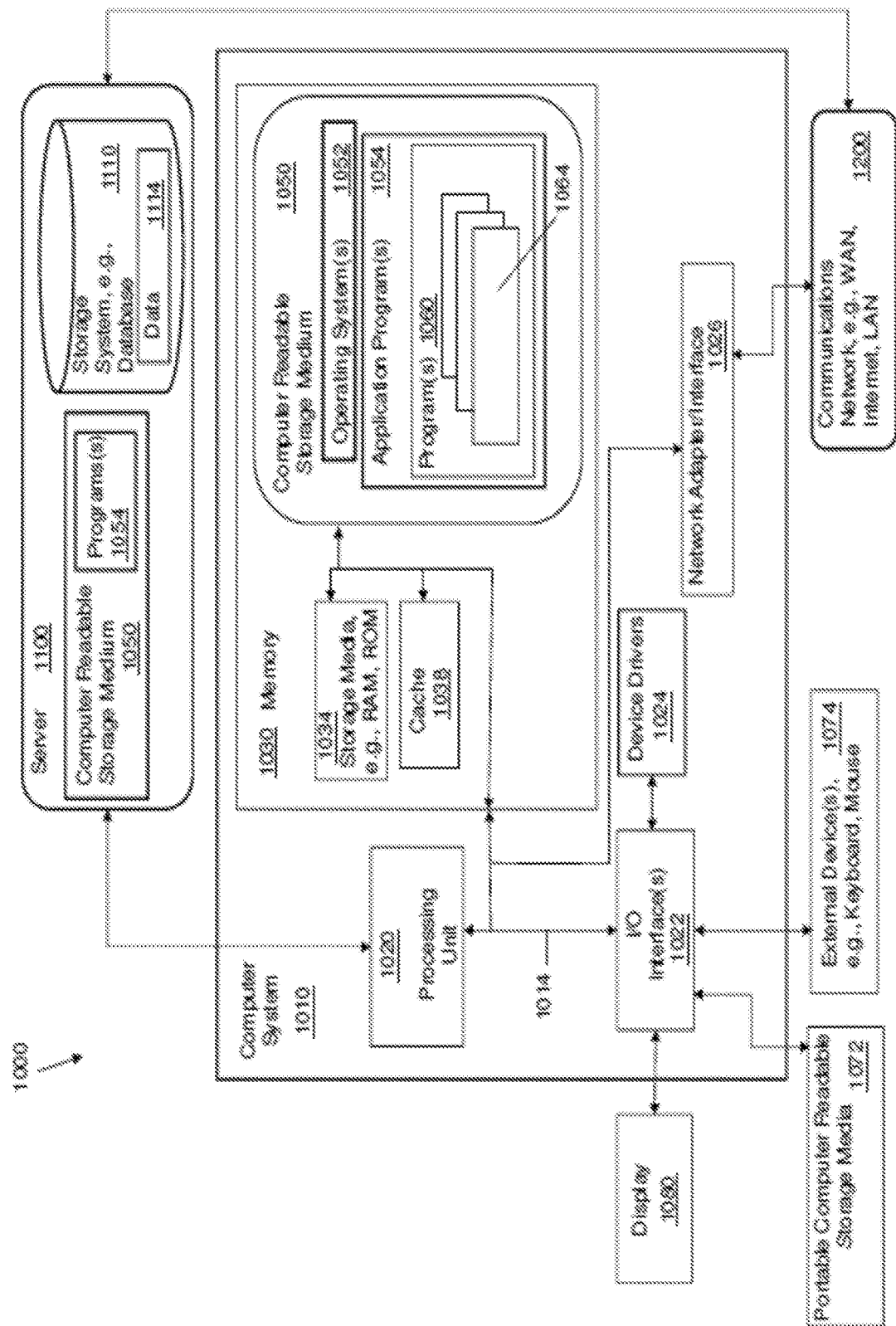
FIG. 3 is a block diagram depicting the hardware components of the content analysis and summary generation system of FIG. 1, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a web site accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 (FIG. 2), for example, may be embodied in one or more computer programs, generically referred to as a program(s) 1060 and can be stored in memory 1030 in the computer readable storage medium 1050. For example, the program 1060 can include the modules 150-164 described above with reference to FIG. 1b. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
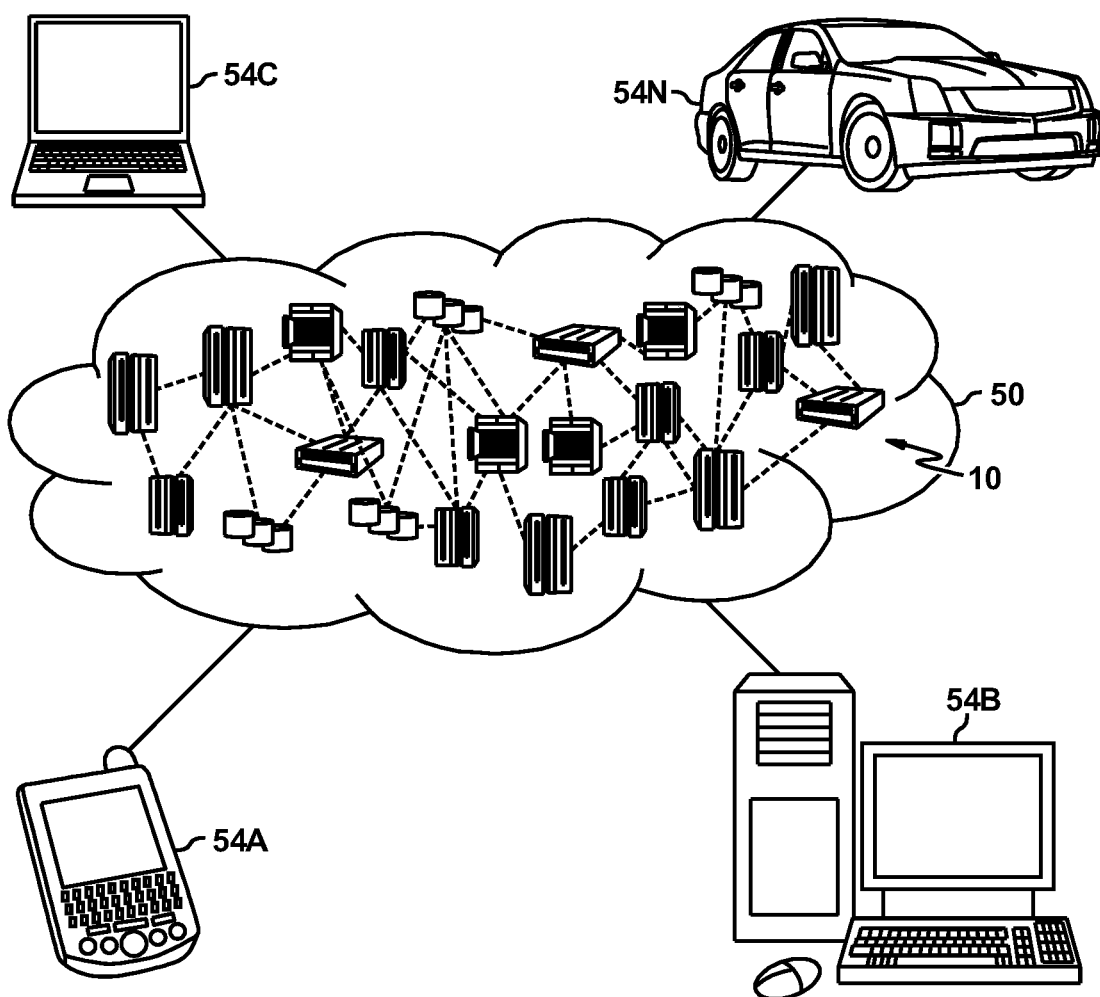
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
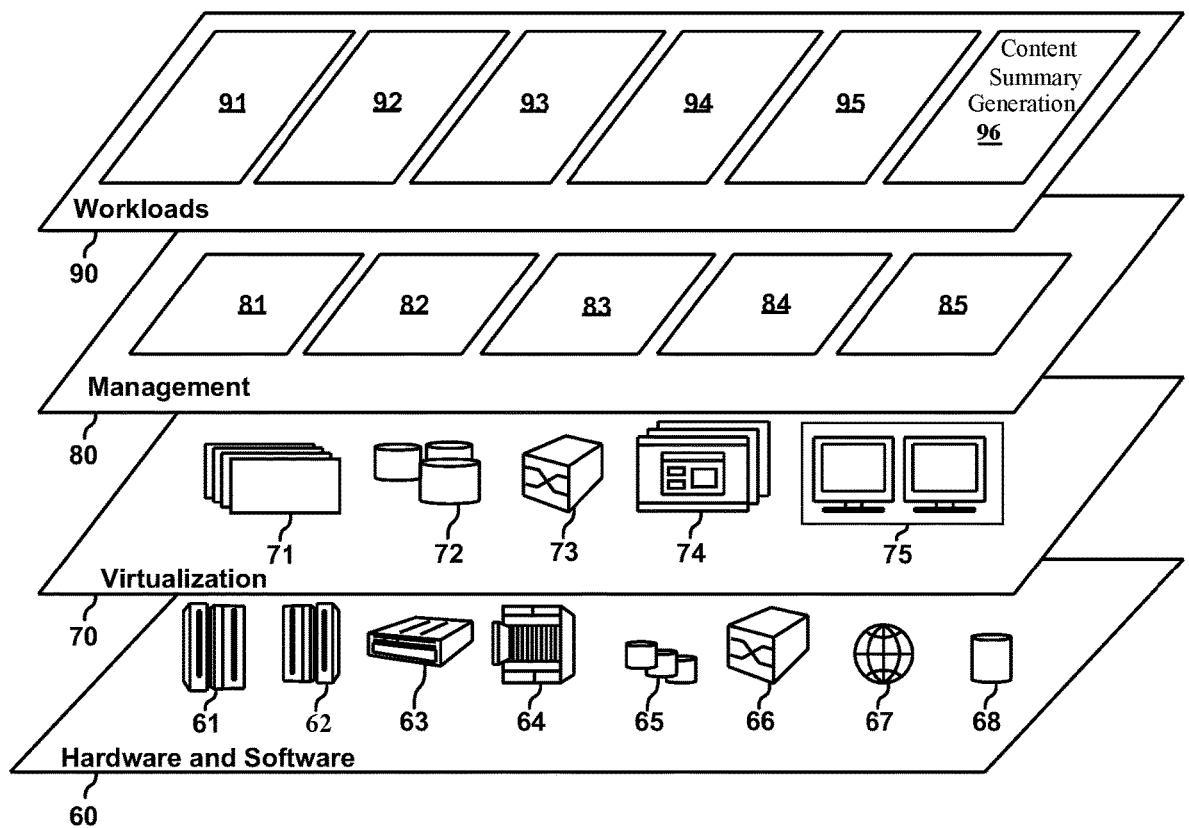
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content summary generation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:
1. A method for content summary generation, the method comprising:
  collecting, by a computing device, application data from one or more applications;

archiving, by the computing device, the application data into a datastore;
generating, by the computing device, a network graph based on the archived application data;
detecting, by the computing device, a user's focus on a piece of content contained within the one or more applications;
retrieving, by the computing device, data associated with the piece of content detected to be in focus;
determining, by the computing device, the user's skill in relation to the piece of content detected to be in focus;
determining, by the computing device, complexity of the piece of content in relation to the determined skill of the user;
generating, by the computing device, a summary of the piece of content based on the determined skill of the user, the summary containing at least one posting by a second user from the archived application data on a concept included in the piece of content, wherein the concept is identified based on the complexity of the piece of content in relation to the determined skill of the user and the at least one posting is identified by a relationship in the network graph; and
presenting, by the computing device, the summary to the user.

2. The method as in claim 1, wherein determining the complexity of the piece of content in relation to the determined skill of the user further comprises:
analyzing, by the computing device, connections within the network graph between the user and topic of the piece of content in focus.

3. The method as in claim 1, wherein generating, by the computing device, the summary of the piece of content based on the determined skill of the user is in response to determining the user's skill in relation to the piece of content detected to be in focus does not exceed a threshold.

4. The method of claim 1, wherein retrieving the data associated with the piece of content detected to be in focus, further comprises:
processing, by the computing device, the data associated with the piece of content detected to be in focus into one or more entities using natural language processing.

5. The method as in claim 1, further comprising:
updating, by the computing device, the network graph based on the determined skill of the user.

6. The method as in claim 5, wherein updating the network graph based on the determined skill of the user is a temporary update.

7. The method as in claim 1, wherein the user's focus on a piece of content is detected based on at least one of the group consisting of: x-y-z pointer tracking, finger point tracking, user eye gaze, time spent viewing the piece of content, and repeated views of the piece of content.

8. A computer program product for content summary generation, the computer program product comprising:
a computer-readable storage medium having program instructions embodied therewith, wherein a computer readable storage medium is not a transitory signal per se, the program instructions executable by the computer to cause the computer to perform a method, comprising:
collecting, by a computing device, application data from one or more applications;
archiving, by the computing device, the application data into a datastore;
generating, by the computing device, a network graph based on the archived application data;
detecting, by the computing device, a user's focus on a piece of content contained within the one or more applications;
retrieving, by the computing device, data associated with the piece of content detected to be in focus;
determining, by the computing device, the user's skill in relation to the piece of content detected to be in focus;
determining, by the computing device, complexity of the piece of content in relation to the determined skill of the user;
generating, by the computing device, a summary of the piece of content based on the determined skill of the user, the summary containing at least one posting by a second user from the archived application data on a concept included in the piece of content, wherein the concept is identified based on the complexity of the piece of content in relation to the determined skill of the user and the at least one posting is identified by a relationship in the network graph; and
presenting, by the computing device, the summary to the user.

9. The computer program product as in claim 8, wherein determining the complexity of the piece of content in relation to the determined skill of the user further comprises:
analyzing, by the computing device, connections within the network graph between the user and topic of the piece of content in focus.

10. The computer program product as in claim 8, wherein generating, by the computing device, the summary of the piece of content based on the determined skill of the user is in response to determining the user's skill in relation to the piece of content detected to be in focus does not exceed a threshold.

11. The computer program product of claim 8, wherein retrieving the data associated with the piece of content detected to be in focus, further comprises:
processing, by the computing device, the data associated with the piece of content detected to be in focus into one or more entities using natural language processing.

12. The computer program product as in claim 8, further comprising:
updating, by the computing device, the network graph based on the determined skill of the user.

13. The computer program product as in claim 12, wherein updating the network graph based on the determined skill of the user is a temporary update.

14. The computer program product as in claim 8, wherein the user's focus on a piece of content is detected based on at least one of the group consisting of: x-y-z pointer tracking, finger point tracking, user eye gaze, time spent viewing the piece of content, and repeated views of the piece of content.

15. A system for content summary generation, the system comprising:
a computer system comprising, a processor, a computer readable storage medium, and program instructions stored on the computer readable storage medium being executable by the processor to cause the computer system to:
collecting, by a computing device, application data from one or more applications;
archiving, by the computing device, the application data into a datastore;
generating, by the computing device, a network graph based on the archived application data;

detecting, by the computing device, a user's focus on a piece of content contained within the one or more applications;

retrieving, by the computing device, data associated with the piece of content detected to be in focus;

determining, by the computing device, the user's skill in relation to the piece of content detected to be in focus;

determining, by the computing device, complexity of the piece of content in relation to the determined skill of the user;

generating, by the computing device, a summary of the piece of content based on the determined skill of the user, the summary containing at least one posting by a second user from the archived application data on a concept included in the piece of content, wherein the concept is identified based on the complexity of the piece of content in relation to the determined skill of the user and the at least one posting is identified by a relationship in the network graph; and presenting, by the computing device, the summary to the user.

16. The system as in claim 15, wherein determining the complexity of the piece of content in relation to the determined skill of the user further comprises:

analyzing, by the computing device, connections within the network graph between the user and topic of the piece of content in focus.

17. The system as in claim 15, wherein generating, by the computing device, the summary of the piece of content based on the determined skill of the user is in response to determining the user's skill in relation to the piece of content detected to be in focus does not exceed a threshold.

18. The system of claim 15, wherein retrieving the data associated with the piece of content detected to be in focus, further comprises:

processing, by the computing device, the data associated with the piece of content detected to be in focus into one or more entities using natural language processing.

19. The system as in claim 15, further comprising:

update, by the computing device, the network graph based on the determined skill of the user, wherein updating the network graph is based on the determined skill of the user is a temporary update.

20. The system as in claim 15, wherein the user's focus on a piece of content is detected based on at least one of the group consisting of: x-y-z pointer tracking, finger point tracking, user eye gaze, time spent viewing the piece of content, and repeated views of the piece of content.

* * * * *